Dec. 8, 1953 G. XAVIER-NÖEL POTIER 2,662,116

DOUBLE MODULATED PULSE TRANSMISSION

Filed Dec. 6, 1950 2 Sheets-Sheet 1

INVENTOR

GASTON XAVIER NOEL POTIER

By: Haseltine, Lake & Co.

AGENTS

INVENTOR
GASTON XAVIER NOEL POTIER
By: Haseltine, Lake & Co.
AGENTS

Patented Dec. 8, 1953

2,662,116

UNITED STATES PATENT OFFICE 2,662,116

DOUBLE MODULATED PULSE TRANSMISSION

Gaston Xavier-Noël Potier, Versailles, France

Application December 6, 1950, Serial No. 199,399

4 Claims. (Cl. 179—15)

The present invention relates to an improved method for electrical transmission with multiple communication channels, by means of interleaved or intermingled trains of recurrent impulses according to the principle of division in time.

Accordingly, one of the objects of the method according to the invention is to provide time division pulse multiplex systems in which each communication pulse is subjected to two simultaneous modulations, one of them acting on its position in time with respect to predetermined reference instants, the other one acting on another parameter of the pulse, such as for instance, its amplitude or duration. As in known methods of multiplex time division pulse transmission, the total transmission time is divided into equal intervals of time of a duration T each subdivided into elementary equal and shorter time intervals $T/(N+1)$, N being the number of communication channels and an elemental time interval of $1/(N+1)$ being reserved for a synchronization signal (often called a pilot signal), not subjected to any modulation and to which a particular shape is given, whereby it is easily identified by the receiving apparatus and used for its synchronization. It is not indispensable for all time intervals reserved for each channel to be equal, but this arrangement is generally adopted as being easier to carry out.

Inside each channel time interval, a pulse is generated, one of the parameters of which is caused to vary as a function of the instantaneous amplitude of the corresponding channel modulation signal. The expressions "amplitude modulation" and "duration modulation" are sufficiently clear in themselves. The expression "position in time" of a pulse is to be understood as the time interval existing between a reference instant fixed with respect to the limits of the time interval allocated to one channel and the time at which this pulse is generated if it is of a short duration. If the pulse is of an appreciable duration, the time of its beginning will be used for defining its position in time, more briefly designated hereinafter as the "position." All the pulses transmitted during the time T constitute a "pulse group." The series of pulses corresponding to a given channel is called a "pulse train."

In conventional methods of multiplex pulse transmission, it is generally undesirable that the values of the various pulse parameters be functions of the instantaneous values of two or more modulation signals. Even in case a modulation signal modifies only one of these parameters while a second modulation signal modifies only another parameter, different from the first one, the usual demodulation methods do not allow separate reconstitutions of the two modulation signals without each reconstituted signal being affected by a crosstalk disturbance caused by the other one. The importance of this crosstalk disturbance can be evaluated when the values of the various components of the elements of the position modulated pulse spectrum are known, in duration and amplitude. This question was studied, particularly, in an article entitled "The spectrum of modulated pulses," published in the "Journal of the Institution of Electrical Engineers" part IIIA, No. 13, 1947, pages 556 to 564 by E. Fitch. By using the formulae given in this paper, it can be shown that, designating by $f_m$ the position modulation frequency and by $l_d$ the maximum displacement in position of the pulses, the crosstalk attenuation between the signal correspondence to the amplitude modulation and the disturbance caused by the position modulation is only equal, after demodulation, to $\frac{1}{2}\pi f_m l_d$. Assuming, for instance, a displacement of 3 microseconds and a modulation frequency of 3000 cycles per second, the crosstalk attenuation given by the above formula is only 25 decibels, which is insufficient in practice. The above example thus shows the necessity for eliminating the disturbance caused in the amplitude modulation by the position displacement of the pulses.

The principal object of the present invention is therefore to obviate the above mentioned drawbacks by means of a method more particularly applicable to cases where it is desired to transmit simultaneously two modulation signals by means of a single pulse train, for instance, on one hand by means of a modulation of the pulse positions and, on the other hand, by means of a second modulation of their amplitudes or durations. This method makes it possible to eliminate, at the receiving end, the disturbing position modulation, as will be explained hereinafter.

The method which characterizes the present invention comprises, at the sending end, measuring, at equidistant instants in time, the instantaneous amplitude of the modulation signal which it is desired to transmit by a modulation other than position modulation, storing for a certain time the electrical values resulting from the measurement, using these electrical values to modulate pulses which may possibly be already position modulated, according to a parameter other than their position, measuring, at the receiving end, the value of this parameter of the pulses, storing for a certain time, in the form of an electrical value, the value thus measured, causing said electrical value to modulate auxiliary signals generated at instants equidistant in time, and finally demodulating these auxiliary signals by known methods.

Otherwise stated, the transmission method which characterizes the present invention comprises essentially, at the sending end of a transmission system and for each one of the pulse trains to be subjected to two different simultaneous modulations, first modulating, by means of a first modulation signal, the position of said pulses, measuring at predetermined instants, equidistant in time and equal in number to the pulses of one train, the instantaneous amplitude of a second modulation signal, storing the value of said amplitude thus measured during a time at least equal to the elementary time interval allocated to one transmission channel and at most equal to that elapsing between two consecutive measurements, modulating in amplitude or duration and proportionally to said measured and stored amplitude the pulse already modulated in position, transmitting by any known means the pulse thus twice modulated to the receiving end of the transmission system, causing, at said receiving end, the modulated pulses to act on two series of apparatus at the inputs of which they are applied, the first series modifying the pulses to rid them of the amplitude or duration modulation, the second series measuring and storing, for a time at least equal to an elementary time interval allocated to one communication channel but shorter than the duration of one pulse group, the value of the amplitude or duration modulation of the pulses, causing the value thus stored to act, at predetermined instants equidistant in time, on the amplitude or duration of auxiliary signals occurring at said instants, demodulating, on the one hand, said duration or amplitude modulated auxiliary signals, demodulating, on the other hand, the above mentioned position modulated pulses, of which the amplitude or duration modulation has been eliminated, and directing the demodulation products obtained toward utilization circuits.

The above-described method necessitates the use, in a communication system for carrying out the said method of complementary transmitting and receiving equipment, as it is obvious that otherwise undesirable and possibly prohibitive crosstalk and distortion would occur, due to lack of proper synchronization between the "sampling" of modulation signals at the transmitting end and their restitution at the receiving end.

A particular embodiment of such a communication system will now be described by way of example and without in any way limiting the scope of the method which is the object of the invention. It will be obvious for any expert in the art that the storing device hereinafter described could be replaced by various known devices, such as storage electronic tubes, for instance. Other elements involved, such as modulators, generators, synchronizing devices and demodulators may in practise be of any suitable design.

Other features and objects of the invention will appear more clearly from the following description with reference to the appended drawings, wherein.

Figure 1:
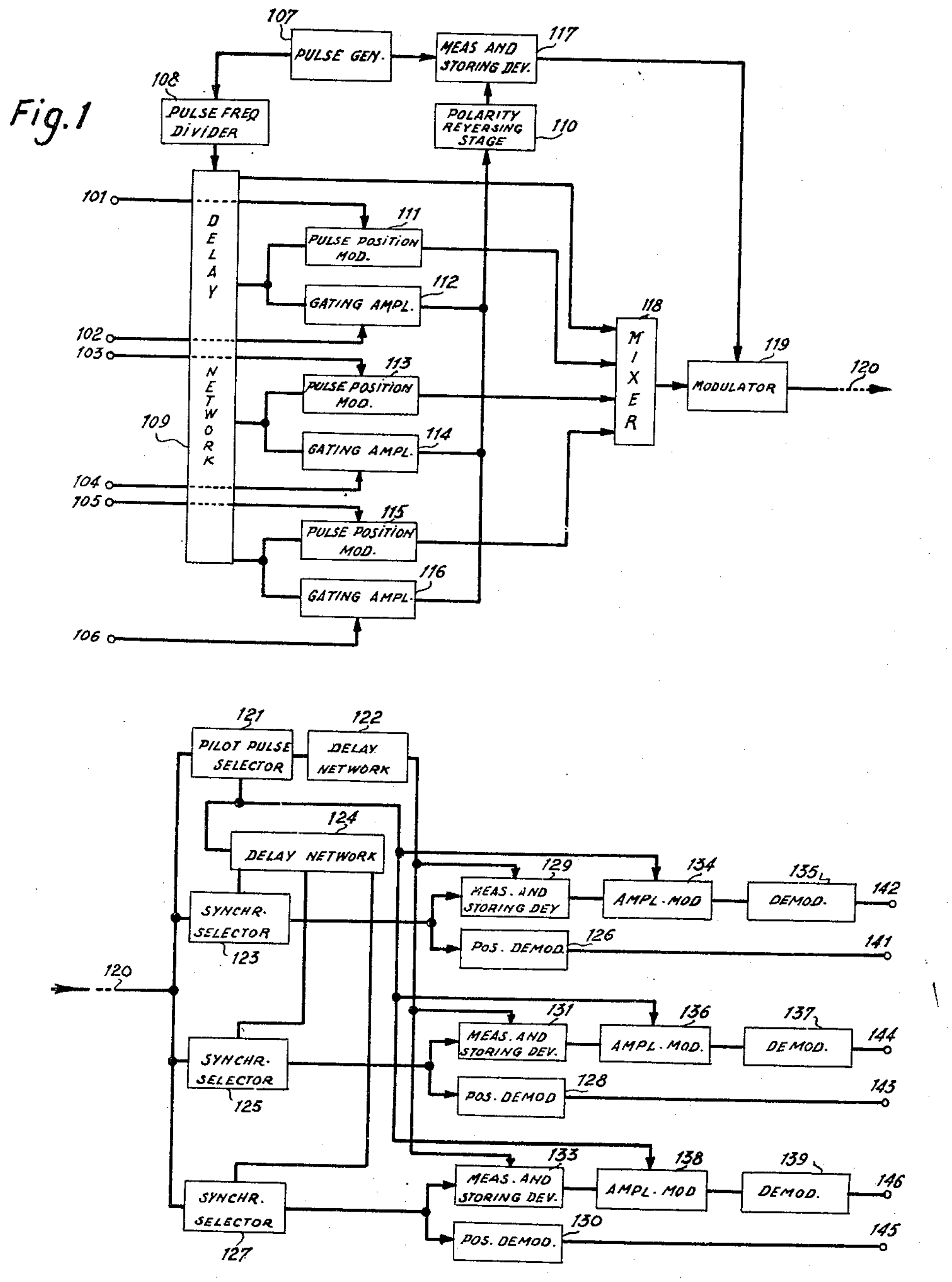
Fig. 1 shows, schematically an embodiment of a device utilizing the method of the invention and allowing the transmission of pulses simultaneously modulated in amplitude or duration and in position.

In Figure 1, it has been assumed, by way of example, that a six channel system is dealt with, using three pulses plus a pilot pulse (synchronization pulse). The operation of the system will be explained more particularly hereinafter in the case where each of the three trains of communication pulses is position and amplitude modulated.

The operation of the device of Figure 1 may be explained hereinafter as follows:

A generator 107 delivers pulses, the frequency of which is equal to the repetition frequency of the pulse groups multiplied by the number of pulses contained in each group, four in the present case (i. e. one pilot pulse and three channel pulses, each of the latter corresponding to two channels). A pulse frequency divider 108, receiving these pulses restores pulses having the group repetition frequency and supplies a delay network 109 having as many taps as there are pulses per group. This procedure for effecting the positioning of pulses in time is known and does not require a detailed explanation. The position modulator 111 of the first channel receives pulses from the network 109 defining the time allocated to this channel, and, through the lead 101, the modulation signal to be transmitted. The position modulated pulse is then transmitted to the mixer 118. This mixer is a device which makes it possible to apply to one output circuit signals from several input circuits. The position modulator 113 of the third channel receiving its modulating signal through the lead 103, and the position modulator 115 of the fifth channel receiving its modulating signal through the lead 105, operate in a similar manner. At the output from the mixer 118, three position modulated pulses are obtained to which the pilot pulse is added.

The modulation signals from the second, fourth and sixth channels are applied at 102, 104, 106 to gating amplifiers 112, 114, 116.

Each gating amplifier, such as 112, for instance, operates during a short instant under the action of a pulse from the delay network 109 at the beginning of the time reserved for the first channel; at that time, the modulating signal of the second channel which is brought thereto through the lead 102 gives rise to a pulse with an amplitude proportional to that of said modulating signal. The gating amplifiers 114 and 116 also operate at the beginning of the times reserved for the fourth and sixth channels with which they are associated respectively. All the signals delivered by 112, 114 and 116 are applied, after their polarities have been reversed by a polarity reversing stage 110, to a single measuring and storing device 117. The function of this measuring and storing device, the operation of which will be explained in detail further on, is to measure and store, during the time reserved for one communication channel, the magnitudes of the amplitude modulated pulses delivered by 110. The measuring and storing device 117 is brought back to its rest position at the end of the time reserved for each channel by rest setting pulses obtained from the generator 107. Thus there is obtained, at the output from the measuring and storing device 117, a train of three pulses of a constant total duration, the amplitude of each one of them having been defined individually by 112, 114 or 116. These pulses will be used later as modulating signals and are applied on the one hand, to a modulator 119, for instance an amplitude modulator, which, on the other hand, receives from the mixer 118 already position modulated pulses.

The signals modulated both in amplitude and position, from 119, are directed towards the transmission channel 120 and received at the receiving end thereof.

It is, of course, necessary, in the case of simultaneous amplitude and position modulation by 119, that the depth of the amplitude modulation be limited, so that the pulse amplitude does not become too low, at certain times, which, at the receiving end, would hinder the demodulation of their position modulation. Similarly, if the second modulation is a duration modulation, the fact must be taken into account that the duration and position modulations limit each other, and the sum of the displacement in position and of the variation in duration of a pulse cannot exceed the total duration of the elementary time interval available for one communication channel.

At the receiving end, the pilot pulses are first segregated by means of the pilot pulse selector 121 and are then used as control pulses for other apparatus, particularly for the synchronous selectors 123, 125, 127, which sort out the pulses according to the time intervals reserved for each channel. Control pulses are supplied, to this effect, to 123, 125, 127 via 121 through the delay network 124. Each modulated pulse is separated by a particular selector such as 123 and applied to the corresponding position demodulator, such as 126, after its amplitude or duration have been made constant, so that its position only remains variable. Thus, at 141, 143 and 145, the signals for the first, third and fifth channels are obtained.

The same pulse is applied, as it exists at the output from the selector 123, to a measuring and storing device 129. In case the pulses are amplitude modulated, the measuring and storing element 129 is identical with the one used at the sending end 117, but its setting at rest is effected only once per cycle, by means of the pilot pulse issuing from the selector 121, suitably delayed by a delay network 122. The amplitude modulated and stored pulses, received at the output of 129 are used for amplitude modulating auxiliary and non-delayed pulses from 121, applied to the amplitude modulator 134. Since the pulses thus obtained are not position modulated, the restoring of the modulation signal is effected without any difficulty, by known means, by the demodulator 135 at the output of which, at 142, the signal for the second channel is obtained.

The assemblies 128, 131, 136, 137 on one hand, and 130, 133 138, 139 on the other hand, act respectively in a similar manner after the selectors 126 and 127. The signals from the demodulation of the position modulation are obtained at the output terminals 141, 143, 145, corresponding respectively to the first, third and fifth channels, and the signals from the demodulation of the amplitude modulation are obtained at the output terminals 142, 144, 146 corresponding respectively to the second, fourth and sixth channels.

Figure 2:
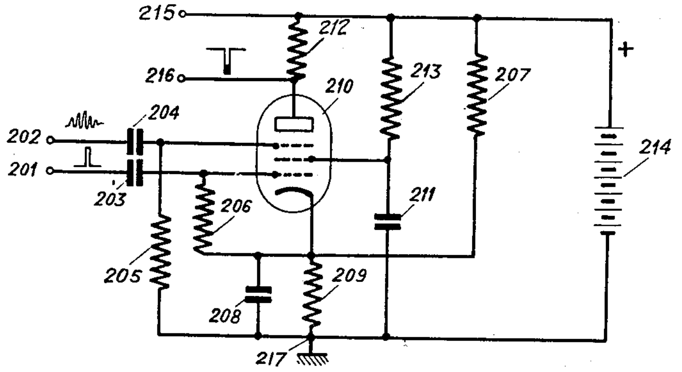
Figure 2 shows, schematically, the embodiment of a gating amplifier generating pulses with an amplitude proportional to the instantaneous amplitude of a modulation signal.

The operation of a gating amplifier such as 112 will be better understood by reference to Figure 2. In Figure 2, the control grid of the pentode tube 210 is acted upon, through the condenser 203, by pulses from the delay network 109 applied at 201. This grid is connected to the cathode of the tube through a resistance 206. The high voltage source 214 energizes the screen of the same tube through the resistance 213. The cathode and screen are connected to the negative terminal 217 of 214 through decoupling condensers 208, 211, while the anode is connected with the positive terminal of 214 through the resistance 212. The third grid, or suppressor grid of the tube, is acted upon by the modulation signal from the communication channel (102, 104 or 106), applied through 202 via the condenser 204. This third grid is connected with 217 through the resistance 205. The time constant of the assembly (205, 206) is selected with a sufficiently high value with respect to the pulse recurrence period so that, under the action of the electron current absorbed by the control grid, the latter assumes a biasing such that the pulse peaks correspond to a potential for such grid but little different from that of the cathode. The values of 207 and 209 are so selected that the average potential of the suppressor grid places the working point in a rectilinear portion of the anode current/suppressor grid voltage characteristic. Positive pulses being applied at 201, other pulses, with a negative polarity and an amplitude varying linearly with that of the modulation signal, applied at 202 are collected on the anode of the tube and applied to the output terminals 215, 216 of the apparatus.

Figure 3:
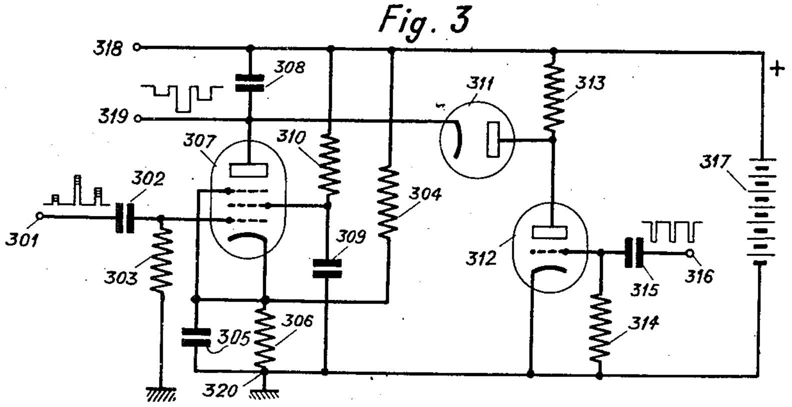
Figure 3 shows, schematically, the embodiment of a measuring and storing device for measuring and storing the magnitude of an amplitude modulated pulse.

These pulses are transmitted to the polarity reversing stage 110 of Figure 1 which makes them positive and, at the output from 110, they are applied to the measuring and storing device 117 of Figure 1 the operation of which will be better understood by referring to Figure 3 which represents it schematically.

The function of this apparatus is to store for a certain time the amplitude of the pulses applied at its input by 110, after which it is set at rest.

In Figure 3, the amplitude modulated pulses from 110 are applied by means of 301, through the condenser 302 to the control grid of the pentode tube 307, said control grid itself being connected through the resistance 303 with the negative terminal 320 of a high voltage source 317. The cathode of the tube is connected with 317 through a resistance 306 shunted, as regards alternating current by a condenser 305, while the screen of the same tube is supplied by the same high voltage source and its potential is suitably fixed by the resistance 310 and uncoupled at 320 by the condenser 309. A resistance 304, connecting the positive terminal of 317 with the cathode of the tube ensures for the latter a suitable fixed bias. The anode of the tube is connected with the positive terminal 318 of 317 through a condenser 308. This condenser may be discharged through the diode 311 and resistance 313 when the rest-setting pulses of a negative polarity from 107 are applied, through 316 and through the condenser 315 to the grid of the triode 312, the anode of which is connected, on one hand with that of the diode and, on the other hand, through 313 with the positive terminal 318 of 317. The average potential of the control grid of 312 is fixed by a resistance 314 connecting said grid with 320. The stored amplitudes of the pulses applied at the input to the apparatus are collected at its output terminals 318, 319.

Figure 4:
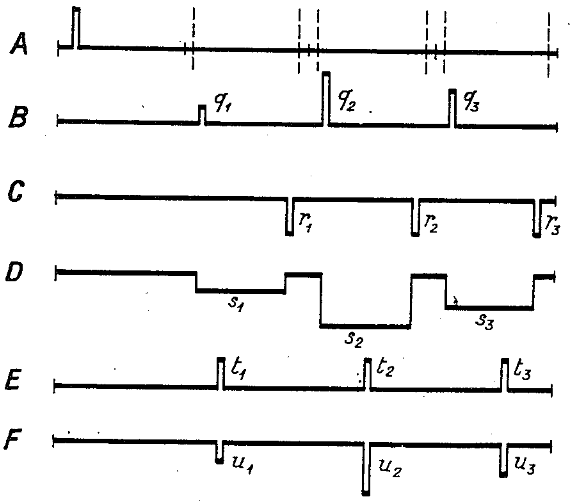
Figure 4 is a diagram of the voltages of the signals appearing, during operation, at the various points of the apparatus of Figure 3 when said apparatus is used in a sending device according to the invention.

The operation of the measuring and storing device shown in Figure 3 will be better understood by referring to Figure 4 which is a graphical representation of the signal voltages existing at various points in the device.

There has been shown, in Figure 4, at A, the pilot pulse, in solid line, and the time reserved for each communication channel, in dotted lines. The pulses from the three gating amplifiers 112, 114, 116, the polarity of which is reversed by 110 are transmitted at instants coinciding with the beginning of such time; they are shown on line 3 of Figure 4 at $q_1$, $q_2$, $q_3$.

The values of resistances 304, 306 of Figure 3 being selected in such a manner that the working point of the tube be, during pulses, in the linear portion of the anode current/control grid voltage characteristic, said pulses $q_1$, $q_2$, $q_3$ etc., from 112, 114, 116, are applied to the control grid. Since these pulses are amplitude modulated, the charge assumed by the condenser 308 varies with this amplitude. The setting at rest of the measuring and storing device is effected at the end of the time reserved for each one of the channels by means of the pulse train shown by $r_1$, $r_2$, $r_3$ at C on Figure 4 which is obtained from the generator 107. There are thus found, at the output terminals 318, 319 of the measuring and storing device 318, 319, pulses such as $s_1$, $s_2$, $s_3$ shown at D in Figure 4. The amplitude of $s_1$, for instance, is proportional to the instantaneous value of the modulation signal applied at the input to the apparatus delivering the pulse $q_1$ and the duration of $s_1$ is equal to the time reserved for the first pulse. Similarly, the amplitude of $s_2$ is proportional to the modulation signal applied to the apparatus delivering the pulse $q_3$ and its duration is equal to the time reserved for the second pulse. Similar properties exist for the third pulse.

The pulses supplied by the position modulators 111, 113, 115 are, after their mixing in the mixer 118, shown at $t_1$, $t_2$, $t_3$ on line E of Figure 4. The position of each one of them, inside the time reserved for it, is a function of the instantaneous value of the modulation signal applied at the input to the corresponding position modulator. If these pulses are applied to an amplitude modulator receiving, on the other hand, as modulation voltages, the pulses $s_1$, $s_2$, $s_3$, pulses are obtained such as those shown by $u_1$, $u_2$, $u_3$ on line F of Figure 4. The position of $u_1$ is a function of the signal carried by the lead 101 of Figure 1, while its amplitude is a function of the signal carried by the lead 102. The same holds for pulses $u_2$ and $u_3$, the positions of which are respectively functions of the signals carried by the leads 103 and 105 and the amplitudes of which are respectively functions of the signals carried by the leads 104 and 106.

The operation of the transmission system of Figure 1 has been explained above, in connection with that of the apparatus of Figures 2 and 3, in a manner more particularly applicable to the case when the two simultaneous modulations applied to the same pulse are effected in position, on one hand and in amplitude on the other hand. If it is desired that the second modulation be a duration modulation instead of an amplitude modulation, it will be sufficient to replace, at the sending end, the modulator 119 by a duration modulator, and, at the receiving end, to insert, before the receiving measuring and storing devices 129, 131, 133, modulation converters transforming the duration modulation into an amplitude modulation. Such apparatus as duration modulators and modulation converters are known in the art and it is not necessary to explain their constitution in detail.

Although the present invention has been described in connection with particular types of embodiment, it is clear that it is not limited thereto and that it is capable of numerous variants and modifications within its scope. In particular, it is possible to put in application the means of the invention by means of circuits different from those shown in the drawings.

What is claimed is:

1. In a multiplex time division electric pulse communication system, a plurality of communication channels including an even number of said channels, and means for impressing modulation signals from each of said channels upon a transmitting device, said transmitting device comprising a generator of periodic pulses, a pulse frequency divider fed from said generator, a delay network fed with pulses from said divider and including taps so arranged as to stagger in time pulses from said divider, pulse position modulators in number equal to half said even number of channels, means for controlling each one of said position modulators by modulation signals from one of said channels and by pulses from one of said taps, gating amplifiers in number equal to half said even number of channels, means for controlling each one of said amplifiers by pulses from one of said taps and by modulation signals from one of said channels excluding any channel whose modulation signals control one of said position modulators, a pulse polarity reversing stage, means for applying to said stage pulses issued from all said gating amplifiers, a storing device controlled by said generator for storing for a predetermined time interval substantially equal to the period of the pulses from said generator and in the form of an electric charge across a condenser a voltage proportional to the amplitude of each one of pulses issued from said polarity reversing stage, a mixer circuit, means for applying to said mixer circuit position modulated pulses from all of said position modulators together with non-modulated pulses from said pulse divider, an amplitude modulator fed on one hand by pulses from said mixer circuit and on the other hand from said voltage stored in said storing device, and means for impressing modulated signals from said amplitude modulator upon a communication circuit.

2. In a multiplex time division electric pulse communication system, a plurality of communication channels including an even number of said channels, means for impressing modulation signals from each of said channels upon a transmitting device, said transmitting device comprising a generator of periodic pulses, a pulse frequency divider fed from said generator, a delay network fed with pulses from said divider and including taps so arranged as to stagger in time pulses from said divider, pulse position modulators in number equal to half said even number of channels, means for controlling each one of said position modulators by modulation signals from one of said channels and by pulses from one of said taps, gating amplifiers in number equal to half said even number of channels, means for controlling each one of said amplifiers by pulses from one of said taps and by modulation signals from one of said channels excluding any channel whose modulation signals control one of said position modulators, a pulse polarity reversing stage, means for applying to said stage pulses issued from all said gating amplifiers, a storing device controlled by said generator for storing for a predetermined time interval substantially equal to the period of the pulses from said generator and in the form of an electric charge across a condenser a voltage proportional to the amplitude of each one of pulses issued from said polarity reversing stage, a mixer circuit, means for applying to said mixer circuit position modulated pulses from all of said position modulators together with non-modulated pulse from said pulse divider, a pulse duration modulator fed on one hand by pulses from said mixer circuit and on the other hand from said voltage stored in said storing device, and means for impressing modulated signals from said duration modulator upon a communication circuit.

3. In a multiplex time division electric pulse communication system, a plurality of pulse trains comprising at least one train of unmodulated periodic pilot pulses and a given integer number of interleaved trains of pulses each of which is simultaneously modulated in time position and in amplitude, a communication circuit transmitting the whole of said pulse trains, and means for impressing said whole of said pulse trains upon a receiving device, said receiving device comprising a pilot pulse selector for separating said pilot pulses from said modulated pulses, means for impressing said selected pilot pulses upon a first delay network provided with a number of taps equal to said given number and so arranged as to stagger in time said selected pilot pulses, synchronous pulse selectors in said given number and each controlled by pulses from one of said taps, means for impressing the whole of said pulse trains upon each one of said synchronous selectors, pulse position demodulators in said given number and controlled by said selected pilot pulses from said pilot pulse selector through a second delay network, storing devices in said given number and controlled by selected pilot pulses from said pilot pulse selector through same said second delay network, each of said storing devices being adapted to store for a predetermined time interval substantially equal to the period of said selected pilot pulses and in the form of an electric charge across a condenser a voltage proportional to the amplitude of an amplitude modulated pulse applied to itself, means for applying selected pulses from each one of said synchronous selectors to one of said pulse position demodulators and to one of said storing devices, means for impressing demodulated signals from each one of said pulse position demodulators upon one utilization circuit, pulse amplitude modulators in number equal to said given number and controlled by selected pilot pulses from said pilot pulse selector, means for impressing stored voltage from each one of said storing devices upon one of said pulse amplitude modulators, pulse amplitude demodulators in number equal to said given number, means for impressing amplitude-modulated pulses from each one of said amplitude modulators upon one of said amplitude demodulators and means for impressing demodulated signals from each of said modulators upon one utilization circuit.

4. In a multiplex time division electric pulse communication system, a plurality of pulse trains comprising at least one train of unmodulated periodic pilot pulses and a given integer number of interleaved trains of pulses each of which is simultaneously modulated in time position and in duration, a communication circuit transmitting the whole of said pulse trains, and means for impressing said whole of said pulse trains upon a receiving device, said receiving device comprising a pilot pulse selector for separating said pilot pulses from said modulated pulses, means for impressing said selected pilot pulses upon a first delay network provided with a number of taps equal to above said given number and so arranged as to stagger in time said selected pilot pulses, synchronous pulse selectors in said given number and each controlled by pulses from one of said taps, means for impressing the whole of said pulse trains upon each one of said synchronous selectors, pulse position demodulators in said given number and controlled by said selected pilot pulses from said pilot pulse selector through a second delay network, storing devices in said given number and controlled by selected pilot pulses from said pilot pulse selector through same said second delay network, each of said storing devices being adapted to store for a predetermined time interval substantially equal to the period of said selected pilot pulses and in the form of an electric charge across a condenser a voltage proportional to the duration of a duration modulated pulse applied to itself, means for applying selected pulses from each one of said synchronous selectors to one of said pulse position demodulators and to one of said storing devices, means for impressing demodulated signals from each one of said pulse position demodulators upon one utilization circuit, pulse amplitude modulators in number equal to said given number and controlled by selected pilot pulses from said pilot pulse selector, means for impressing stored voltage from each one of said storing devices upon one of said pulse amplitude modulators, pulse amplitude demodulators in number equal to said given number, means for impressing amplitude-modulated pulses from each one of said amplitude modulators upon one of said amplitude demodulators and means for impressing demodulated signals from each of said demodulators upon one utilization circuit.

GASTON XAVIER-NOËL POTIER.

References Cited in the file of this patent

UNITED STATES PATENTS

| Number | Name | Date |
|---|---|---|
| 2,328,118 | Labin | Sept. 30, 1947 |
| 2,474,244 | Grieg | June 28, 1949 |
| 2,499,844 | Boothroyd | Mar. 7, 1950 |